March 19, 1940. W. F. SAUL 2,194,248
COIL WINDING MACHINE
Filed Dec. 21, 1938 6 Sheets-Sheet 1

Inventor:
William F. Saul,
By Z.T. Wolcensmith
Attorney.

March 19, 1940.   W. F. SAUL   2,194,248
COIL WINDING MACHINE
Filed Dec. 21, 1938   6 Sheets-Sheet 2

Inventor:
William F. Saul,
By Z. T. Wobensmith 2nd
Attorney.

March 19, 1940. W. F. SAUL 2,194,248
COIL WINDING MACHINE
Filed Dec. 21, 1938 6 Sheets-Sheet 3

Inventor
William F. Saul,
By Z. T. Wobensmith 2nd
Attorney.

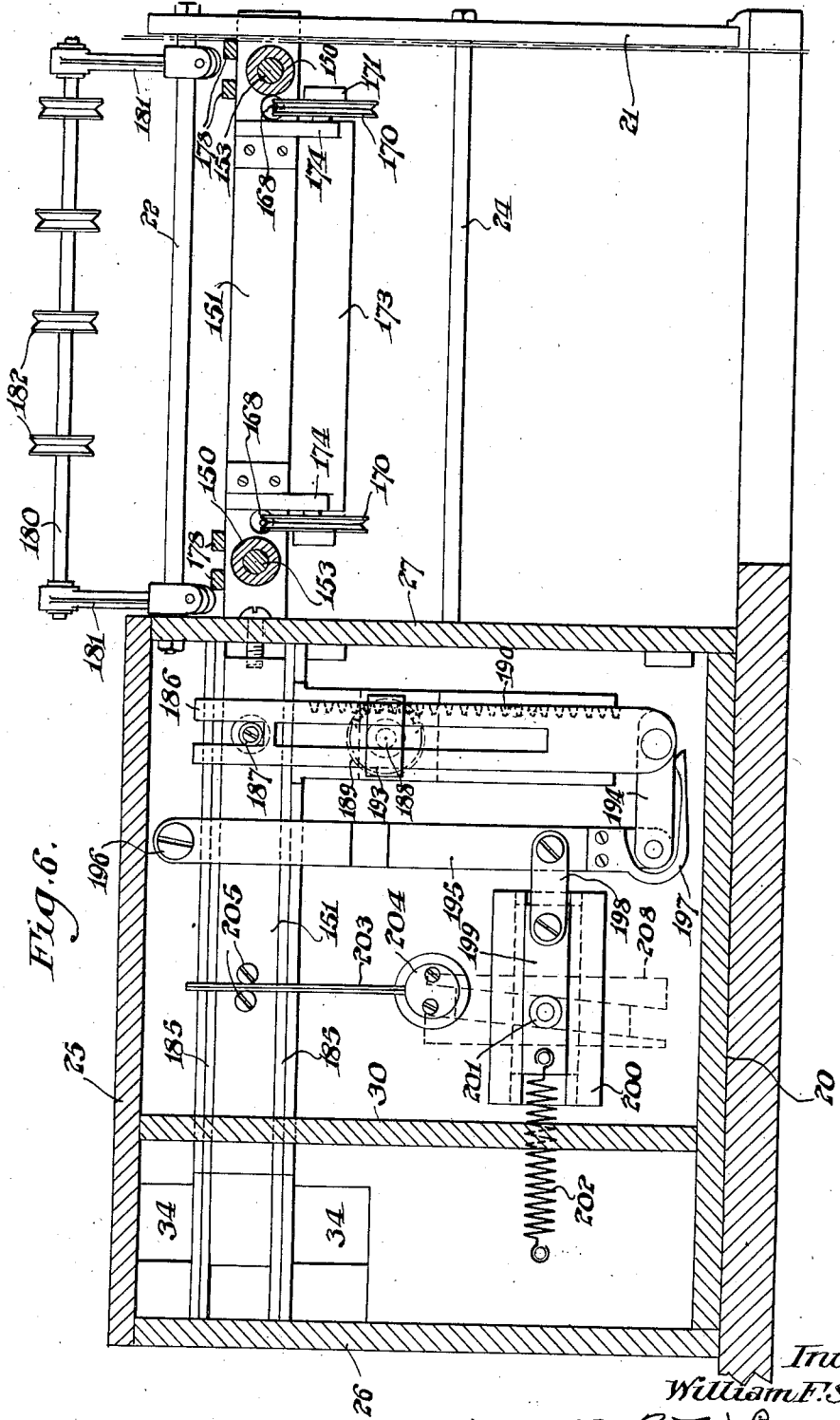

Inventor:
William F. Saul,
By J. T. Wobensmith
Attorney.

March 19, 1940.  W. F. SAUL  2,194,248
COIL WINDING MACHINE
Filed Dec. 21, 1938  6 Sheets-Sheet 6
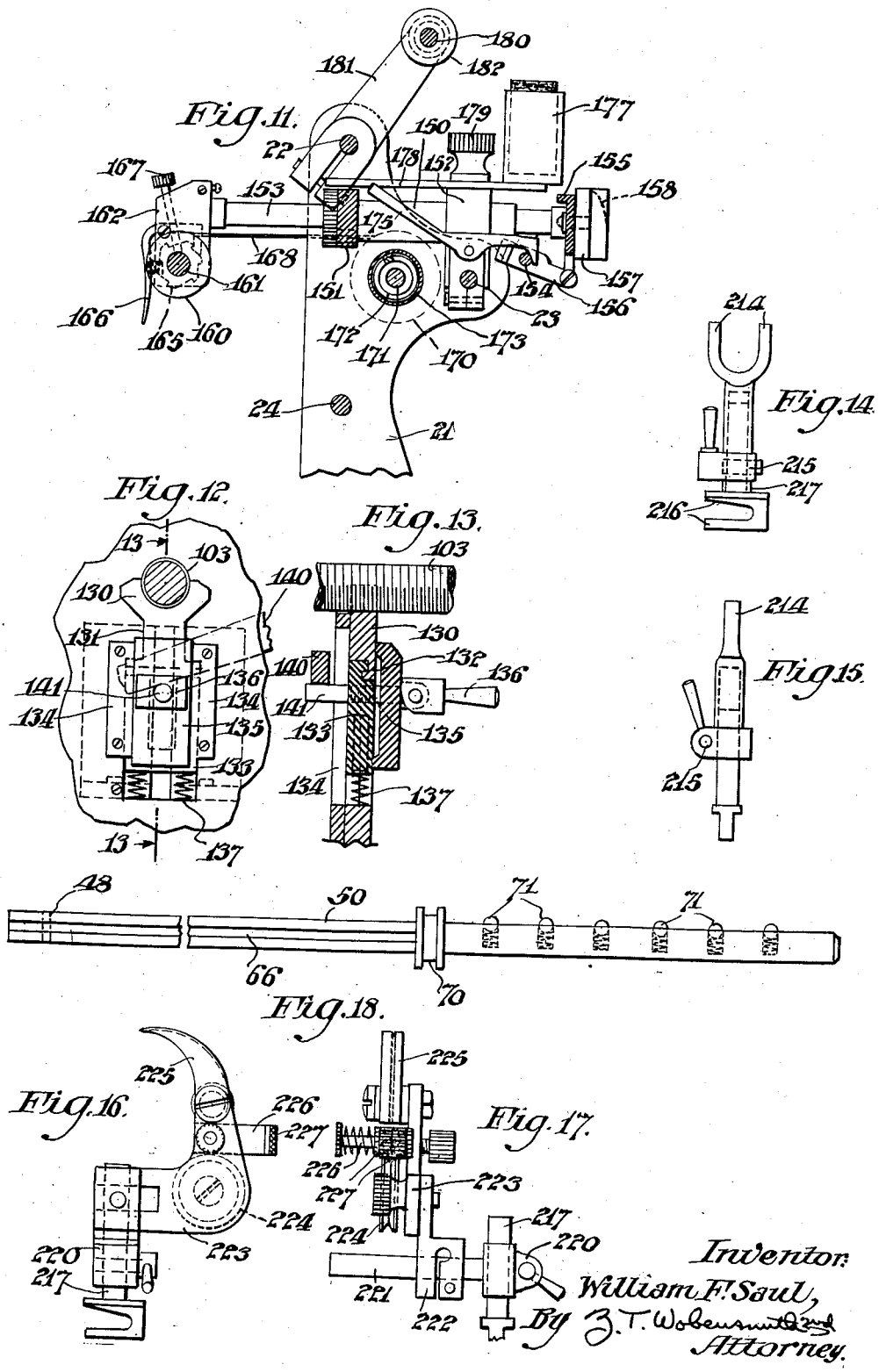
Inventor:
William F. Saul,
By B. T. Wobensmith
Attorney.

Patented Mar. 19, 1940

2,194,248

UNITED STATES PATENT OFFICE 2,194,248

COIL WINDING MACHINE

William F. Saul, Barnsboro, N. J.

Application December 21, 1938, Serial No. 246,973

27 Claims. (Cl. 242—25)

This invention relates to coil winding machines and more particularly to machines adapted to wind coils for use in the electrical field, and for other purposes.

The invention relates particularly to a coil winding machine having a wide range of use and which is adjustable for winding coils of a variety of kinds and sizes closely conforming to specifications as to the size of the wire and the number and disposition of the turns of the wire.

It is an object of the present invention to provide a coil winding machine which is adapted to simultaneously wind a plurality of coils of wire to the desired specifications.

It is a further object of the present invention to provide a coil winding machine which, by suitable adjustments, may be utilized for successively winding a plurality of coils of predetermined sizes and with the wire of the coil disposed in any predetermined manner.

It is a further object of the present invention to provide a coil winding machine adapted for winding coils which are substantial duplicates, and successively winding either a plurality of such coils or duplicate groups of different coils.

It is a further object of the present invention to provide a coil winding machine in which the winding of the wire is controlled to provide in each coil a predetermined width of coil and a predetermined number of turns.

It is a further object of the present invention to provide a coil winding machine in which the adjustments for the width of the winding and also for the height of the winding may be readily effected.

It is a further object of the present invention to provide a coil winding machine which will automatically effect a predetermined spacing between coils.

It is a further object of the present invention to provide a coil winding machine adapted to wind simultaneously and also in sequence a plurality of coils of the same character.

It is a further object of the present invention to provide a coil winding machine wherein a plurality of coils of different characteristics may be formed upon a single core.

It is a further object of the present invention to provide a winding machine having a wide range of coil winding adjustability, and which additionally may be quickly and easily adjusted from a machine for universal, layer, or accumulative winding to a machine for flat winding.

It is a further object of the present invention to provide a coil winding machine which will be completely automatic in counting the number of turns and in effecting the spacing between turns.

It is a further object of the present invention to provide a coil winding machine which will be automatic in the winding of the coils and with which a minimum amount of skill on the part of the operator will be required.

Other objects of the invention will appear from the annexed specification and claims.

The nature and characteristic features of the invention will be more readily understood from the following description, taken in connection with the accompanying drawings forming part hereof, in which:

Fig. 6 is a vertical sectional view taken approximately on the line 6—6 of Fig. 1;

Fig. 11 is a vertical sectional view taken approximately on the line 11—11 of Fig. 2;

Fig. 12 is a fragmentary end elevational view showing the nut for engaging the lead screw and the mounting for the nut;

Fig. 13 is a vertical sectional view taken approximately on the line 13—13 of Fig. 12;

Fig. 14 is an end elevational view of a yoke employed for one character of winding;

Fig. 15 is a front elevational view of the yoke shown in Fig. 14;

Fig. 16 is a side elevational view of a wire guide which is employed for one character of winding;

Fig. 17 is an elevational view of the wire guide shown in Fig. 16 as seen from the left of Fig. 16;

Fig. 18 is a side elevational view showing a modified form of core spindle for use with small cores.

Figure 1:
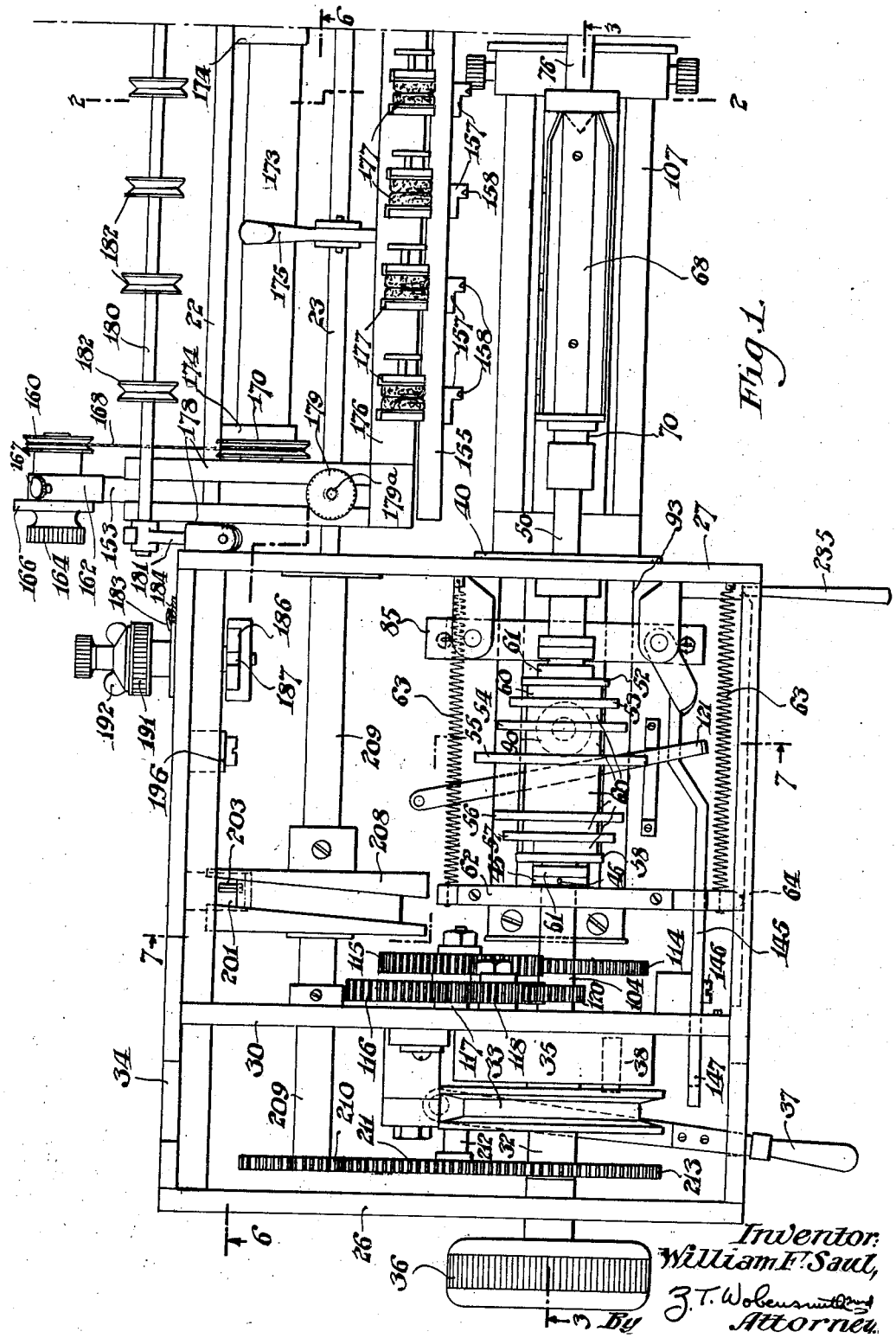
Figures 1 and 2 show respectively in plan the main and right hand portions of a preferred embodiment of the coil winding machine of the present invention, certain parts of the casing being removed to show the interior construction, the portion shown in Fig. 2 being to the right of line 2—2 of Fig. 1.

It will, of course, be understood that the description and drawings herein contained are illustrative merely, and that various modifications and changes may be made in the structure disclosed without departing from the spirit of the invention.

Referring more particularly to the drawings, it will be seen that there is provided a casing 20 within which certain portions of the control mechanism are enclosed, and an end standard 21 secured to said casing 20 by an upper horizontal bar 22, an intermediate horizontal bar 23 and a lower horizontal bar 24.

The casing 20 preferably has a removable top cover 25, a removable end plate portion 26 at the left hand end, a removable end plate portion 27 at the right hand end of the casing 20 which carries certain of the movable parts, and a front door member 28, so that access to the interior may be readily obtained. The casing 20 is preferably provided with an interior partition 30 extending from front to rear, which serves as a support for certain portions of the mechanism, as will hereinafter be apparent.

A main drive shaft 32 for the machine is journaled in the partition 30 and in the end wall 26, and may be driven by a pulley 33 from any suitable source of power, as for example an electric motor (not shown), connected through openings 34 in the rear wall of the casing 20 to the pulley 33. The pulley 33 is loosely mounted on the shaft 32 and a suitable clutch and brake mechanism 35 is provided so that the pulley 33 may rotate the shaft 32 or revolve freely thereon. A hand wheel 36 is removably mounted on the main drive shaft 32 outside the end wall 26 for manual operation of the main drive shaft 32.

A horizontally movable trip lever 37 is provided for controlling the clutch and brake mechanism 35. The trip lever 37 is pivotally mounted on the casing 20 and extends outwardly from the front of the casing 20 for manual actuation by the operator when it is desired to initiate the winding operations.

The trip lever 37 is adapted to engage a clutch actuating lever 38 when in the right hand position (Fig. 1), to move the clutch mechanism 35 into engagement so that the main drive shaft 32 is rotated upon rotation of the pulley 33. A spring 39, in engagement with the clutch actuating lever 38, is provided for normally urging the clutch actuating lever 38 and the trip lever 37 toward the left and to the clutch disengaging position, as hereinafter more fully referred to.

The clutch and brake mechanism 35, by reason of the braking characteristics which are effective in the disengaged clutch position, prevents undesired rotation of the main shaft 32.

The right hand end of the main shaft 32 is journaled in a plate 40 carried by the casing wall 27, and this portion of the main shaft 32 is hollow from the right hand end substantially to the partition wall 30. The main shaft 32 is also provided with a slot 41.

Figure 10:
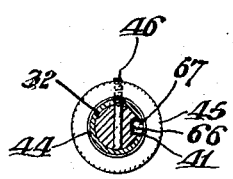
Fig. 10 is a vertical sectional view taken approximately on the line 10—10 of Fig. 3.

An externally threaded cylindrical member 44 is mounted on the main shaft 32. The cylindrical member 44 has a collar 45 thereon, and for certain types of winding is keyed by a pin 46 (see Fig. 10) which extends through the collar 45, the cylindrical member 44 and slot 41, and through an aperture 48 in a spindle 50 so that the cylindrical member 44 is rotatable with the main shaft 32 and movable longitudinally with respect thereto when the pin 46 is in position, as hereinafter more fully referred to.

The cylindrical member 44 is threaded on the exterior thereof for the reception of spacing disks 52, 53, 54 and 55, increasing in diameter toward the central disk 55 on one side thereof and spacing disks 56, 57 and 58, decreasing in diameter on the other side of the central disk 55. The spacing disks are arranged in a stepped relationship for successively spacing the respective coils, as hereinafter more fully referred to. Provision is made for varying the spacing between the disks by the use of spacers 60 of widths selected in accordance with the spacing desired between the coils. Shoulders or lock nuts 61 are provided at each end of the cylindrical member 44, for securing the spacing disks 52 to 58, inclusive, and the spacers 60 in fixedly locked position on the cylindrical member 44.

A removable cross head 62 is provided within the casing 20, has a split bearing for mounting it on the shaft 32, and is mounted at one or the other end of the cylindrical member 44 in contact with one of the shoulders 45 or 61. One end of the cross head 62 may be guided in the front wall of the casing 20 as indicated at 64. Tension springs 63 are provided which extend from the outer ends of the cross head 62. If the cross head 62 is secured to the left of the cylindrical member 44 (see Figs. 1 and 3), for utilization of the spacing disks 52, 53, 54 and 55, the tension springs 63 are secured to the end wall 27 for urging the cross head 62 and the parts carried thereby toward the right. If the cross head 62 and the parts carried thereby are to be urged toward the left, for utilization of the spacing disks 55, 56, 57 and 58, the cross head 62 is mounted at the right hand end of the cylindrical member 44 and the springs 63 are secured to the partition wall 30.

The spindle 50 is provided having an outer end portion for the reception of the core or tube upon which the coils are to be wound. The spindle 50 has the aperture 48 therethrough for engagement by the pin 46 under certain conditions hereinafter referred to. The spindle 50 also has a keyway 66 extending therealong for engagement by the key 67 provided in the main shaft 32.

Figure 3:
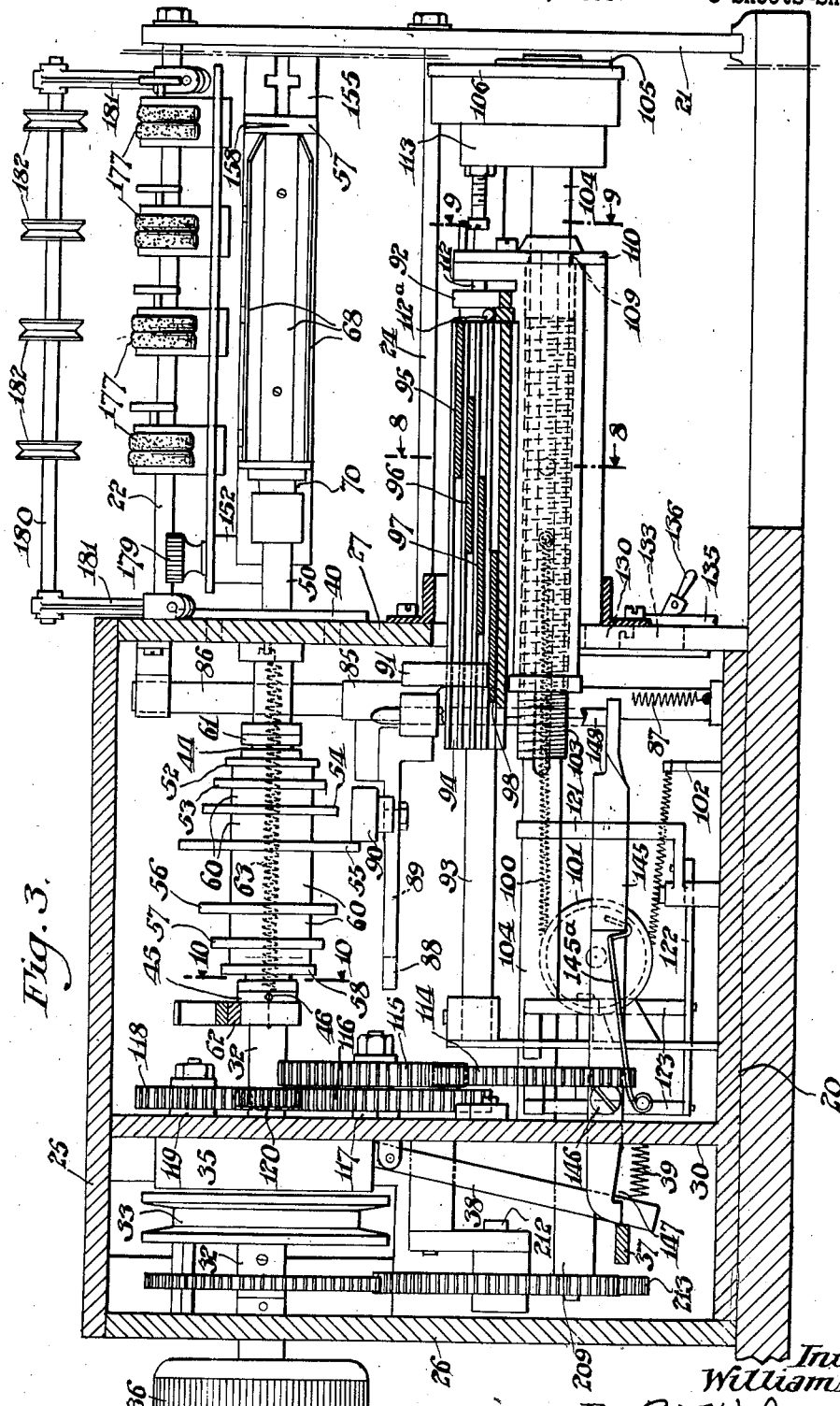
Fig. 3 is a vertical view of the winding machine shown in Fig. 1 and partly in elevation and partly in vertical section to show the details of construction.

In the form of spindle illustrated in Figs. 1 and 3, a plurality of longitudinally extending plates 68 are provided, one of the plates 68 being forced outwardly by springs (not shown) therealong for clamping the core or tube during the winding operation.

The spindle 50 is provided with a groove 70 so that the spindle 50, in one condition of operation may be positively actuated in either longitudinal axial direction, as hereinafter more fully referred to.

The outer end of the spindle 50 is preferably tapered as indicated to facilitate the applying of the core or tube thereon.

A modified form of spindle is shown in Fig. 18, in which a plurality of spring pressed balls 71 are employed in lieu of the plates 68 as illustrated in Figs. 1 and 3. The spindle 50 shown in Fig. 18 is particularly adapted for cores or tubes of small internal diameter.

The standard 21 preferably has secured thereto a horizontally disposed post 72 (see Fig. 2) at the outer end of which an arm 73 is pivotally mounted. The arm 73, movement being limited by the stop in 74, extends forwardly from the post 72 and the outer end of the arm 73 has a socket 75 thereon within which a supporting pin 76 is mounted. The pin 76 has a conical end and is spring pressed by means of a spring 77 into engagement into the end of the spindle 50.

The pin 76 may be retracted manually for insertion of a core or tube upon the spindle 50 and a latch lever 78 having a tooth 79 for engagement with a tooth 80 on the post 72 is provided for locking the arm 73 with the pin 76 in engagement with the spindle 50.

The latch lever 78 may be operated to withdraw the tooth 79 to release the arm 73, so that the arm 73 may be swung downwardly upon retraction of the pin 76, for access to the end of the spindle 50.

It will be noted that the spindle 50, the spacing disks 52 to 58, inclusive, and the cylindrical member 44 on which they are carried, and the cross head 62, may be moved by the operator to the left, as shown in the drawings, against the force of the springs 63, or if the springs 63 are oppositely located may be moved to the right by the operator, for purposes hereinafter referred to.

A vertically movable head 85 is provided, the head 85 being slidably mounted on vertically disposed guides 86 and being normally urged downwardly by springs 87.

The vertically movable head 85 is provided with an arm 88 having a slot 89 therein for mounting a roller 90. The roller 90 is adapted to be positioned in the slot 89 at the right hand end thereof as illustrated in Fig. 3 for engagement respectively with the disks 52, 53, 54 and 55, in accordance with the vertical positioning of the arm 88. The roller 90 is also adapted to be positioned at the left hand end of the slot 89 for engagement, respectively, with the disks 58, 57, 56 and 55, in accordance with the vertical positioning of the arm 88 when these disks are utilized and is also preferably positioned at the left hand end of the slot 89 if none of the spacing disks are utilized.

The head 85 also has secured thereto a downwardly extending follower finger 91 and it will be seen that the roller 90 is controlled in its engagement with one of the disks in accordance with the vertical positioning of the follower finger 91.

Figure 7:
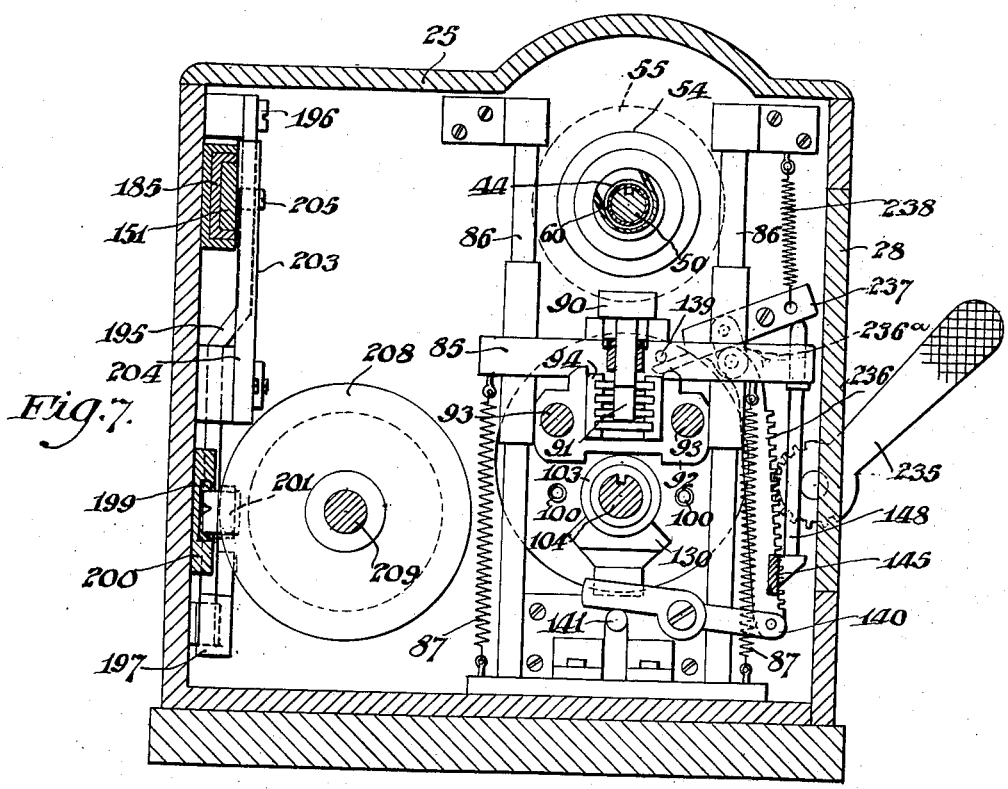
Fig. 7 is a vertical sectional view taken approximately on the line 7—7 of Fig. 1.
Figure 8:
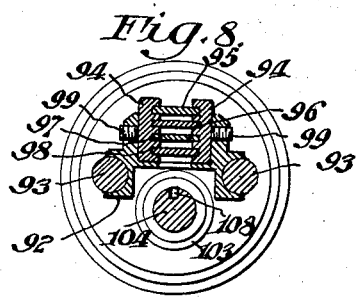
Fig. 8 is a vertical sectional view taken approximately on the line 8—8 of Fig. 3.
Figure 9:
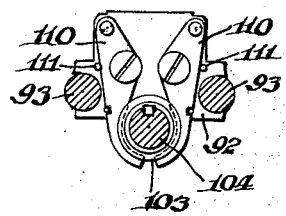
Fig. 9 is a vertical sectional view taken approximately on the line 9—9 of Fig. 3.

The structure for controlling the vertical positioning of the follower finger 91 is controlled in accordance with the number of turns of the spindle 50. As shown in Figs. 3, 7 and 8, the control structure includes a counting plate carriage 92 mounted for horizontal movement on guide rods 93. Along the upper face of the carriage 92 channeled sections 94 are provided, pairs of horizontally alined channels being respectively provided for the reception of plates 95, 96, 97 and 98, which are slidable along the channels in the sections 94 for adjustment, and may be secured in place in the channel sections 94 by tightening set screws 99 disposed therealong.

As indicated in Fig. 3, the plates 95, 96, 97 and 98 are disposed in staggered relationship, and by the arrangement of these plates with the proper spacing between the ends thereof, the number of turns of wire wound on the core on the spindle 50 and also spacing of the respective coils along the spindle 50, will be controlled.

A pair of springs 100 is provided, for urging the counting plate carriage 92 toward the left (Fig. 3) to set the carriage 92 automatically for the initiation of each set of winding operations. These springs 100 are secured to the carriage 92 at their ends, passing around guide wheels 101 carried by the casing 20 and the other ends of the springs 100 are secured to standards 102 extending upwardly from the bottom of the casing 20.

A lead screw 103 is provided preferably in the form of a removable externally threaded sleeve and is slidably mounted on a lead screw shaft 104. The lead screw shaft 104 is preferably removably journaled at one end in a suitable bearing carried by the partition wall 30 and at the other end in a plate 105 removably mounted in the wall 106, in the end of the counting plate carriage housing 107, the housing 107 being supported by the guide rods 93. The lead screw shaft 104 is provided with a keyway and a key 108 is mounted in the keyway for effecting rotation of the lead screw 103 upon movement of the lead screw shaft 104.

The lead screw 103 may be removed and replaced, if desired, by another lead screw having a different number of threads per inch. As an illustration of the character of lead screws employed, it may be pointed out that these may have 20, 24, 30 or 36 threads per inch, respectively, although the machine is not limited to these sizes.

A groove 109 is provided at the outer end of the lead screw 103. A pair of latches 110 mounted on the carriage 92 and spring pressed, by means of springs 111, into engagement with the groove are provided so that the carriage 92 and the lead screw 103 move together when the latches 110 are in position in the groove 109. A rotatable mounting pin 112, horizontally and longitudinally disposed and having an eccentric portion thereon for locking a device mounted thereon, is also provided on the carriage 92 adjacent the latches 110 for purposes hereinafter pointed out.

An adjustable stop device 113 for limiting the movement of the carriage 92 to the right or left may be provided and clamped on the guide bars 93.

The lead screw shaft 104 is connected by a train of gears to the main shaft 32. The train may include a gear 114 keyed to the lead screw shaft 104, gears 115 and 116 carried by a shiftable stud shaft 117, a gear 118 carried by another shiftable stud shaft 119 and a gear 120 carried by the main shaft 32.

The gears are removable for replacement with a different train of gears to effect a different speed of rotation of the lead screw shaft 104. The rotation of the lead screw shaft 104 with respect to the main shaft 32 may be of the order of 1 to 5, 1 to 10, 1 to 20, 1 to 40, these being standard shifts, although, if desired, other ratios may be employed. It will be seen that the variation of the lead screws 103 and the variation of the gear train will permit of a wide range of adjustment in the characteristics of the coils.

An adjusting mechanism is provided for adjusting the position of the gear 114 along the shaft 104 when required for certain selections of gears utilized in the gear trains. This mechanism includes an adjusting arm 121 for manual actuation, the lower portion of the arm 121 being pivotally mounted on the bottom wall of the casing 20.

The lower portion of the arm 121 has an actuating rod 122 connected thereto, the rod 122 extending to a pair of upwardly disposed shifting members 123 for engagement with the faces of the gear 114 for shifting the gear 114 out of engagement with the gear 115 as required. Upon actuation of the actuating arm 121 in the opposite direction, the gear 114 may be restored to its engagement with the gear 115 for rotation of the lead screw shaft 104 as before.

A nut body 130 is removably mounted in the end wall 27 of the casing 20 and has a threaded portion at the top thereof for engagement with the lead screw 103, the threaded portion corresponding to the lead screw employed. The details of the nut body 130 and its associated structure are shown in Figs. 12 and 13. The nut body 130 has a downwardly extending shank 131 and the shank 131 has a groove and tongue 132 for engagement, respectively, with a tongue and groove plate 133. The plate 133 is mounted in guideways 134.

A clamping plate 135 and clamping cam lever 136 are provided for clamping the nut 130 with respect to the plate 133, and springs 137 are provided for normally urging the nut assembly upwardly and into engagement with the lead screw 103.

A linkage is provided for setting the machine at the initiation of the winding, which linkage provides for retraction of the finger 91 carried on the cross head 85 from contact with the plates 95, 96, 97 or 98 carried by the counting plate carriage 92 by moving the cross head 85 upwardly, and also provides for retracting the nut 130 from engagement with the lead screw 103 by moving the nut 130 downwardly.

The linkage includes a vertically movable lever 235 mounted on the casing 20, the lever 235 having a curved inner end portion provided with teeth for engagement in a rack 236. The rack 236 is pivotally connected at its upper end by a link 236ᵃ to a rack lever 237 pivoted on the casing wall 27 by means of a suitable pivot pin, one end of the rack lever 237 having a tension spring 238 connected thereto and the other end being notched for sliding engagement with a pin 139 carried by the cross head 85.

The lower end of the rack 236 is secured to a lever 140. The lever 140 is carried by a fulcrum pin and the opposite end of the lever 140 is in engagement with a pin 141 carried by the plate 135 for urging the nut 130 downwardly.

A trip lever control mechanism is also provided for automatically releasing the trip lever 37 and thus disconnecting the clutch mechanism 35 upon the completion of the winding. The trip lever control mechanism includes a horizontally extending latch lever 145, the latch lever 145 being pivotally mounted by means of a stud 146 on a boss carried by the partition 30. The latch lever 145 has a cutaway portion 147 on the underside thereof adjacent the left hand end for engaging the trip lever 37 when the trip lever 37 is moved to the right hand position thereof. The other end of the latch lever 145 is horizontally disposed and extends to a location below the head 85. A latch lever rod 148 extending downwardly from the head 85 is adapted to contact the right end portion of the latch lever 145 and move the same downwardly against the force of the spring 145ᵃ upon downward movement of the head 85, for releasing the trip lever 37. The latch lever rod 148 is adjustable vertically to the desired position and preferably so that a release of the trip lever 37 is effected when the follower finger 91 passes off the lowermost plate 98 or other selected plate, upon completion of a predetermined winding operation.

It will be seen from Fig. 7, that upon movement of the lever 235 in a clockwise direction, or downwardly, the cross head 85 and the follower finger 91 carried thereby will be moved upwardly so as to be clear of the spacing plates 95, 96, 97 and 98, and the nut 130 will simultaneously be moved downwardly and out of engagement with the lead screw 103 so that the spindle 50 and the spacing disks 52, 53, 54 and 55 movable therewith may be moved to the left (Figs. 1 and 3). The carriage 92 with the lead screw 103 connected thereto by the latches 110 may then also be moved to the left without interference of the roller 90 with the spacing disks. The machine may thus be placed in one of its set positions for commencing operations, as hereinafter more fully referred to.

An oscillatable wire feed carriage is provided and preferably includes forwardly extending hollow cylindrical portions 150 secured at their rear ends to an actuating bar 151, the actuating bar 151 being operated as hereinafter more fully referred to. The cylindrical portions 150 are preferably supported by blocks 152 resting on and slidable along the intermediate rod 23. The cylindrical portions 150 have rods 153 slidably mounted therein and a cross rod 154 is connected between the rods 153 below and at the front ends thereof. A slotted bar 155 is clamped on the cross rod 154 by suitable clamps 156 and has a plurality of wire guide members 157 mounted thereon for horizontal adjustment along the bar 155.

Figure 19:
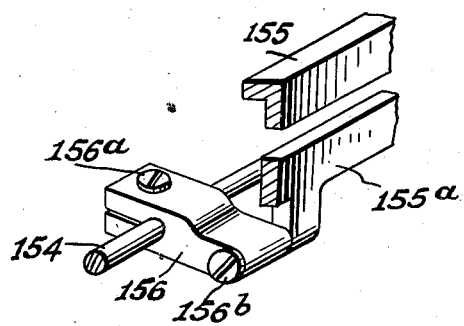
Fig. 19 is a fragmentary view in perspective showing the mounting of the bar on which certain of the wire guides are carried.

Each clamp 156, as shown in Fig. 19, is split at the rear thereof and a screw 156ᵃ holds the clamp 156 in engagement with the cross rod 154 and at the desired adjusted position. The bar 155 has a plurality of lugs 155ᵃ extending downwardly therefrom and screws 156ᵇ which extend through the forward ends of each clamp 156 and are in engagement with the lugs 155ᵃ permit of the swinging of the bar 155 to the desired position of adjustment.

It will be seen that by adjustment of the clamp 156 the vertical, as well as the angular, position of the slotted bar 155 and the wire guides 157 thereon may be adjusted as desired. The wire guides 157 have grooves 158 therein, the lower ends of which preferably are disposed so as to lie in a horizontal plane passing through the longitudinal axis of the spindle 50 so that a proper tangential feed of the wire to the core on the spindle 50 will be effected.

The wire tensioning structure for the wire feed carriage is preferably associated with the rear ends of the rods 153 for the actuation thereof in a forward direction and includes small drums 160 mounted on pins 161 extending through bearing blocks 162 at the rear end of each rod 153, the other ends of the pins 161 having handles 164 thereon and ratchet wheels 165 for engagement with ratchets 166 carried on the pins 161. A fine adjusting screw 167 is also provided for adjusting the position of each pin 161 for selected adjustments between the teeth of the ratchet wheel 165.

Cords 168 extend forwardly from the small drums 160 to drums 170 mounted on opposite ends of an enclosed shaft 171 which has a torque imparted thereto by a spring 172 for impelling the wire feed carriage forwardly. The casing 173 for enclosing the shaft 171 and the spring 172 is secured to the actuating bar 151 by brackets 174.

A latch 175 mounted on the guide bar 23 is provided for engagement with the rod 154 for holding the carriage in the rearward position when desired.

The wire feed carriage also has, on the upper portion thereof, a longitudinally extending frame 176 upon which a plurality of wire tensioning pads 177 are provided, and through which the wire is passed to the wire guides 157.

The frame 176 has rearwardly extending slotted portions 178 and may be adjusted from front to back as desired by means of nuts 179 on the bolts 179ᵃ mounted in the blocks 152. The nuts hold washers in engagement with the slotted portions 178 provided in this frame 176.

A horizontally extending rod 180 is provided adjacent the wire feed carriage and is pivotally mounted by arms 181 on the upper supporting rod 22. The rod 180 is provided with wire guide wheels 182 which are loosely mounted thereon so that wire from the spools or other sources of supply (not shown) may be passed thereover, through the tension pads 177 and to the guides 157 on the wire feed carriage.

It will be noted that four strands of wire are adapted to be employed with the wire feed carriage illustrated, although if desired a greater or a lesser number of strands might be employed by suitable modification of the structure shown, or a lesser number by not utilizing all the wire guides 157. The adaptability of the machine for producing a plurality of identical coils or identical groups of coils will be referred to hereinafter in the description of the operation thereof.

Structure is provided for oscillating the wire feed carriage and includes the actuating bar 151 which is slidably journaled in suitable guides 185 on the rear wall of the casing 20 and on the standard 21. The actuating bar 151 is operated by a lever member 186 which has portions upwardly disposed bearing on a roller 187 carried by the bar 151. The lever member 186 has a movable fulcrum which may be adjusted from the rear of the machine.

The structure for adjusting the position of the fulcrum preferably includes a fulcrum pin 188 mounted in fulcrum block members 193, the pin 188 having a gear 189 thereon for engagement with a rack 190 set in the rear wall of the casing 20, a knob 191 for turning the pin 188 and the gear 189 carried thereby along the rack 190, and a lock nut 192 for locking the fulcrum pin 188 at the desired position of adjustment. A pointer 183 may be mounted on the pin for reading from a graduated scale 184 on the back wall of the casing 20, the width of coil for any predetermined setting of the fulcrum pin 188.

The lower end of the lever member 186 is connected by a short link 194 to a lever 195, the upper end of the lever 195 being pivotally secured to the rear wall of the casing 20 by a bolt 196. At the lower end of the lever 195 a spring support 197 is provided and the lever 195 consists of a portion extending around but out of contact with the end of the link 194 connected to the lever 186, and has a terminal portion supporting the link 194 and the lever 186. The lever 195 has a link 198 connected thereto, the other end of the link 198 being connected to a slide plate 199 mounted in guideways 200 on the rear wall of the casing 20. The slide plate 199 has a cam follower roller 201 thereon.

A spring 202 is preferably secured to the slide plate 199, the other end of the spring 202 being carried by a post extending outwardly from the rear wall of the casing 20.

A pair of flat springs 203 are also provided and are mounted at their lower ends in a supporting clamp 204 secured to the rear wall of the casing 20. The upper ends of the springs 203 pass between pins 205 secured to the actuating rod 151. The springs 203 and the pins 205 are preferably so located as to tend to return the carriage to a predetermined neutral position and substantially eliminate lost motion.

A removable cam 208 is provided and is keyed or otherwise secured to a cam shaft 209. The cam shaft 209 is preferably journaled at one end in the end wall 27 of the casing 20 and extends through the partition 30 within which it is journaled. The cam shaft 209 is connected to the main drive shaft 32 by a train of gears. The train of gears preferably includes a gear 210 keyed to the cam shaft 209, a gear 211 carried by a shiftable stub shaft 212 and a gear 213 keyed to the main shaft 32, the gears being replaceable for varying the speed of rotation of the cam shaft 209. The adjustability of the speed of the cam shaft 209 and the adjustability of the movement of the actuator rod 151 by means of its movable fulcrum pin 188 permits of a wide range of adjustment of the frequency and amplitude of the oscillatory movement of the wire feed carriage for any predetermined cam displacement and it will, of course, be understood that, if desired, the cam 208 may also be replaced by a cam having a different displacement.

In Figs. 14 and 15, a U-shaped yoke member is illustrated which is utilized when the machine of the present invention is to be employed for accumulative winding. The arms 214 of the yoke are adapted to be placed in engagement with the groove 70 of the spindle 50. The yoke member includes a clamp 215 so that with the horizontally disposed locking fingers 216 of the clamping post 217 for engagement with the pin 112 of the carriage 92, the upwardly extending arms 214 of the yoke may be placed in position in contact with the groove 70, and the yoke member locked in place.

In Figs. 16 and 17 there is illustrated a form of wire guide which is utilized in flat winding for winding a single strand of wire. The wire guide includes a body portion 220 adapted to be secured at the desired horizontal position of adjustment to a clamping post 217 of the character shown in Figs. 14 and 15.

The clamping post 217 as thus employed is engaged with the pin 112 on the carriage 92. The body portion 220 has a pin 221 extending outwardly therefrom on which a clamp 222 is adjustably secured. The clamp 222 has a frame 223 horizontally adjustably mounted thereon. The frame 223 has a front wire guide roller at 224, and a pivotally mounted grooved wire guide 225 which may be swingably adjusted to a position to permit of tangential feeding of the wire therefrom. An adjustable spring pressed tensioning guide 226 with tensioning pads 227 is also provided and may be adjusted to impart the desired tension to the wire being guided by the attachment.

The manner in which the machine of the present invention is utilized for different types of windings will now be pointed out, and, at the same time, reference will be had to the control of the number of turns and the disposition thereof in the coils, the spacing between the coils and other features.

The production of coils with cross or universal windings and spaced in a plurality of groups on a core or tube will be considered first.

Figure 2:
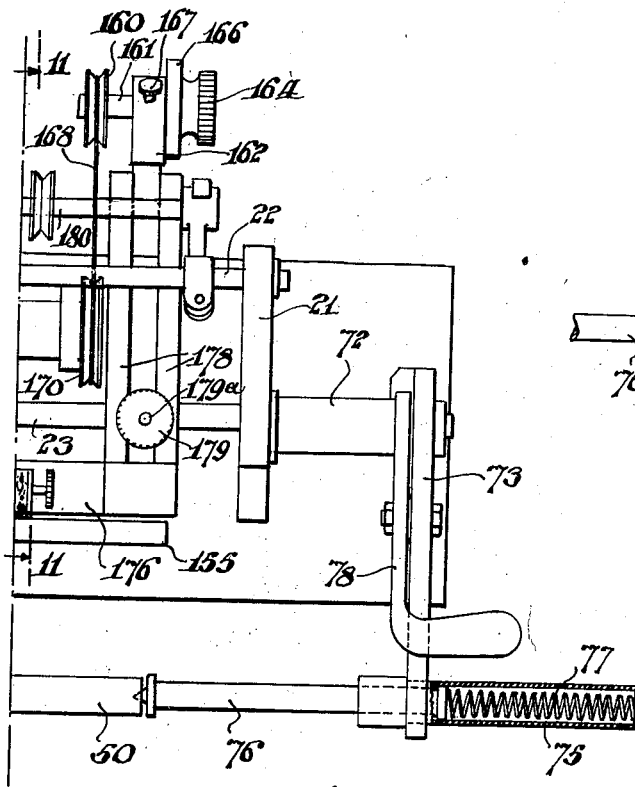
Figure 4:
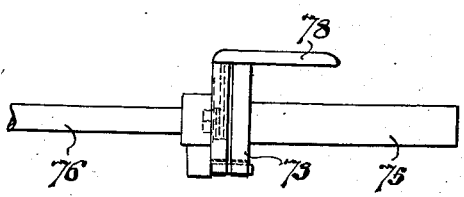
Fig. 4 is a front elevational view of a portion of the structure shown in Fig. 2, and particularly the spindle end support.
Figure 5:
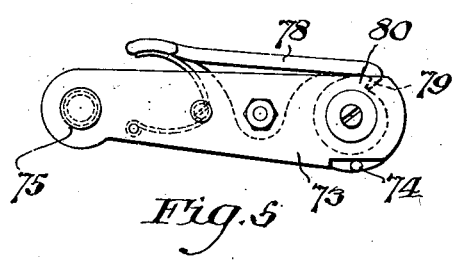
Fig. 5 is an end elevational view of the spindle end support as shown in Fig. 2.

The machine is set up as indicated in Figs. 1, 2, and 3. The desired selection of gears is provided for operating the cam shaft 209 from the main shaft 32 and the desired selection of gears is also provided for actuating the lead screw shaft 104 from the main shaft 32 so that the cam shaft 209, the lead screw shaft 104 and the spindle 50 will operate in a predetermined relationship to each other.

A lead screw 103 having the desired number of threads per inch to accord with winding characteristics desired is mounted on the lead screw shaft 104 for movement therewith. The plates 95, 96, 97 and 98 are adjusted with their ends selectively spaced in accordance with the lead screw pitch and speed of rotation so that the number of turns of wire desired will be provided on each of the successive coils which are to be produced, and, at the same time, duplicated in the other groups of coils. The spacing disks are adjusted to the proper spacing by means of the spacers 60, in accordance with the spacing desired between the successive coils to be wound, and the follower roller 90 is adjusted to position in the slot 89 in accordance with the spacing disks which are utilized, in this instance, the disks 52, 53, 54 and 55.

The bolt 46 is placed in position in the collar 45 and so that it extends through the aperture 48 in the spindle 50 to key the spindle 50 for rotation with the main shaft 32 and to the cylindrical member 44 for movement therewith.

The latch 78 is actuated to free the latch lever 73, and the latch lever 73 and the spindle supporting pin 76 carried thereby are moved downwardly. A core or tube upon which the coil windings are to be provided is placed upon the spindle 50 and the latch lever 73 swung downwardly, the spindle supporting pin 76 being placed with its end in engagement with the end of the spindle 50. The spindle 50 is moved to the left so that the spacing disks 53, 54 and 55 are clear of the follower 90, which may thus be positioned for initial engagement with the disk 52 when the cross head 85 on which the follower 90 is carried is then raised by pressing the lever 235 downwardly.

With the lever 235 in its downward position, the counting plate carriage 92 is moved to the left by the springs 109 so that the finger 91 bears upon the uppermost plate 95 at its right hand end.

If four coils are to be initially wound, four wires are secured to the core or tube on the spindle 50, passed in the grooves 158 on the guides 157 carried by the wire feed carriage, through the tension pads 177 also on the wire feed carriage, and over the rollers 182 on the rod 180.

With the machine set up as thus indicated, when operations are to be initiated, the operator moves the trip lever 37 to the right and into engagement with the notch 147, and by actuation of the clutch mechanism 35 the pulley 33 will be caused to actuate the main shaft 32. The machine will now commence its winding operations.

The spindle 50 will be rotated at the desired predetermined speed, being driven from the main shaft 32 through its train of gears. The wire feed carriage will be oscillated as the spindle 50 rotates, the train of gearing connecting the main shaft 32 to the cam shaft 209 and the characteristics of the cam 208 determining the frequency of oscillation of the wire feed carriage and the amplitude of movement of the wire feed carriage being determined by the cam 208 and the setting of the fulcrum pin 188. The pitch of the wire with respect to the core or tube on the spindle 50 upon which the wire is wound will be determined by the speed of rotation of the spindle 50 in its relationship to the linear speed of the wire feed carriage. The thickness of the coil between the sides or edges thereof for any selected gauge of wire will be determined by the amplitude of movement of the wire feed carriage.

By supplying four wires to the core or tube under the control of the wire feed carriage, four coils may be simultaneously wound with a universal winding, and each coil thus wound will be identical with the other coils which are being simultaneously wound.

As the winding of these coils proceeds the lead screw 103, which is in engagement with the nut 139, is moving to the right and carrying with it the counting plate carriage 92. The movement of the counting plate carriage 92 is thus determined by the speed of rotation of the lead screw shaft 104 and the pitch of the lead screw 103 and the positioning of the plates 95, 96, 97 and 98 fixes and closely and accurately gauges the number of turns of wire supplied to each coil. As the counting plate carriage 92 moves to the right, the finger 91 which is in engagement initially with the uppermost plate 95 will, when the predetermined number of turns of wire have been wound on the coil in accordance with the setting of the plate 95, pass off the end of the plate 95 and drop to the next succeeding plate 96. As this occurs, the roller 90 which, up to this time, has been in contact with the spacing disk 52, will move downwardly. The spindle 50 will be moved to the right by the spring 63 acting on the crosshead 62 and the next spacing disk 53 will be drawn against the roller 90. The wire supplied to the core or tube on the spindle 50 will be stepped to the left a predetermined distance in accordance with the spaces between the leading edges of the respective spacing disks 52 and 53. The winding of a second group of four groups of coils will then proceed.

The winding of these coils will be effected in the same manner as before, the spindle 50 rotating at its new location and the wire feed carriage oscillating. While this is occurring, the lead screw 103 continues to advance the counting plate carriage 92 toward the right until the follower finger 91 passes off the plate 96 to the next lower plate 97 and the winding of a third group of the four groups of coils will be initiated.

This character of operation is successively repeated in accordance with the spacing of the plates on the spacing plate carriage 92 and the spacing of spacing disks on the cylindrical member 44.

It will, of course, be clear that if the spacing plates 95, 96, 97, and 98 have their ends uniformly spaced and if the spacing disks 52, 53, 54 and 55 are likewise uniformly spaced, that sixteen identical coils may be wound in groups of fours, and that by a suitable selection of the spacing of the spacing plates 95, 96, 97 and 98 and the spacing disks 52, 53, 54 and 55, the characteristics of the spacing between the coils, the pitch of the wire on the coils, and the number of turns of wire supplied to the respective groups of coils may be varied over a wide range. It will also be clear that coils in groups of less than four can also be wound with universal windings by providing a lesser number of wires and by suitable adjustments in the machine.

As the finger 91 passes off the last plate 98, or other selected plate, the downward movement of the cross head 85 will operate through the rod 148 and the lever 145 to release the lever 37 from engagement with the trip lever 145 and the lever 37 will then move to the left and disconnect the pulley 33 from the main shaft 32. All that remains for the operator is to remove the core or tube with the windings thereon from the spindle 50, insert a new core or tube on the spindle 50, moving the spindle to the left as before to its set position, and by pressing the lever 235 downwardly permit the spacing plate carriage 92 to be drawn to the left by the springs 100. The wires are then secured to the core or tube and winding, as heretofore referred to, will be initiated upon movement of the trip lever 37 to the right, and the operations heretofore referred to will be repeated.

It will, of course, be clear that the spacing disks 58, 57, 56 and 55 may be utilized by shifting the follower roller 90 to the left hand end of the slot 89, mounting the cross head 62 at the right hand end of the cylindrical member 44, and connecting the springs 63 to the partition wall 30. The operator then, at the beginning of operations, draws the spindle 50 on which the core or tube has been mounted outwardly initially to the right so that the follower roller 90 will engage the spacing disk 58.

The machine of the present invention may also be utilized for layer winding in substantially the same manner as heretofore pointed out for universal winding except that the gear train connecting the main shaft 32 to the cam shaft 209 is changed to provide for a very slow movement of oscillation of the wire feed carriage.

The machine of the present invention may also be used for accumulative or progressive universal winding. In winding coils with a conventional universal winding the core is usually rotated at a fixed location with respect to the oscillatory wire feeding mechanism. In winding accumulative or progressive universal winding and particularly in accordance with the machine of the present invention the core is advanced in a direction along its longitudinal axis while being rotated and while the wire feeding mechanism oscillates over its predetermined path. For accumulative or progressive universal winding, the machine is set up as previously indicated, with the exception that the pin 46 is removed, since control by the spacing disks is not required. The yoke shown in Figs. 14 and 15 is mounted in engagement with the pin 112 on the spacing plate carriage 92 and with the arms 214 of the yoke in engagement with the groove 70 on the spindle 50. The desired number of wires are provided in the grooves 158 on the wire feed carriage as before, and secured to the core or tube on the spindle 50.

With the machine set up as thus indicated, the spindle 50 will be rotated at the desired speed, being driven from the main shaft 32 through its train of gears. The wire feed carriage will be oscillated as the spindle 50 rotates and the spindle 50 will be moved by the spacing plate carriage 92 in accordance with the lead screw 103 which is provided on the lead screw shaft 104. The termination of the winding will be effected as before by the actuation of the trip mechanism by contact of the latch lever rod 148 with the latch lever 145 under the control of the finger 91 and a selected spacing plate adjustment.

It will thus be seen that an accumulative winding of the desired characteristics and having a plurality of courses of wire embodied therein may be wound on the machine.

The machine of the present invention may also be used for flat winding. The machine is set up with the appropriate selection of gears for operating the cam shaft 209 at the desired speed and for actuating the lead screw shaft 104 at the desired speed. The lead screw 103 having the desired number of threads per inch is mounted on the lead screw shaft 104 for movement therewith and the proper nut 130 is inserted in its mounting. The wire feeding attachment, shown in Figs. 16 and 17 is placed in position on the pin 112 and clamped by rotation of the pin 112 by the pin lever 112a and a strand of wire supplied to the feeding attachment.

The strand of wire passes in the front guide roller 224, upwardly between the tensioning pads 227 of the tensioning guide 226, and is guided by the grooved wire guide 225 which is preferably adjusted to provide a tangential feeding of the wire therefrom and to the core carried by the spindle 50.

Two characteristic modes of flat winding are possible in accordance with whether or not the spacing disks are utilized.

If the spacing disks are utilized, with the pin 46 inserted through the collar 45 and into the threaded member 44 and the aperture 48 in the spindle 50, a succession of flat windings may be wound upon the tube or core on the spindle 50. The movement of the spindle 50, and of wire feeding attachment under the control of the lead screw 103, will determine the characteristics of the coils thus wound. A plurality of coils may be successively wound, the coils being spaced in accordance with the setting of the spacing plates 95, 96, 97 and 98.

If desired, the spacing disks may be taken out of operation by removing the pin 46 and a single flat winding may be provided on the core or tube on the spindle 50 extending the desired length thereon. The termination of the winding will be effected as before by the actuation of the trip mechanism by contact of the latch lever rod 148 with the lever 145.

It will be seen from the foregoing that the machine of the present invention has a very wide range of use where rapidity of winding is required and where accuracy of winding to predetermined specifications is essential. Among the types of coils for which the machine is particularly adapted are coils for meters and other electrical instruments, coils for use in radio and television transmitting and receiving apparatus, solenoids, resistors, filament windings and many others with universal, accumulative, flat or layer windings not herein enumerated. In the winding of such coils the operation of the machine is automatic, reliable and accurate and a minimum of supervision is required.

I claim:

1. In coil winding apparatus, the combination of a rotatable member for supporting a core to be wound, said member being movable along its longitudinal axis, means for rotating said movable member at a predetermined speed, a rotatable lead screw, a slidable member operated by said lead screw, and means including members carried by said slidable member for controlling the longitudinal axial movement of said rotatable member.

2. In coil winding apparatus, the combination of a movable member for supporting a core to be wound, said member being supported for rotation and for longitudinal axial movement, means for rotating said movable member at a predetermined speed, a lead screw, a slidable member operated by said lead screw, control members on said slidable member, and means actuated by said control members for regulating the movement of said movable member along its longitudinal axis.

3. In coil winding apparatus, the combination of a movable member for supporting a core to be wound, said member being supported for rotation and for longitudinal axial movement, means for rotating said movable member at a predetermined speed, a shaft, a lead screw operated by said shaft, a slidable member operated by said lead screw, means for actuating said movable member along its longitudinal axis, and means on said slidable member for controlling the operation of said actuating means.

4. In coil winding apparatus, the combination of a spindle for supporting a core to be wound, and means for controlling the movement of said spindle, said means including mechanism for rotating said spindle and spaced members mounted on said spindle for controlling the movement of said spindle along its longitudinal axis to a plurality of longitudinally spaced coil winding positions corresponding respectively to the positions of said spaced members.

5. In coil winding apparatus, the combination of a spindle for supporting a core to be wound, a lead screw, and means for controlling the movement of said spindle, said means including mechanism for rotating said spindle and said lead screw and members operated by said lead screw for controlling the movement of said spindle along its longitudinal axis to a plurality of longitudinally spaced coil winding positions.

6. In coil winding apparatus, the combination of a movable member for supporting a core to be wound, said member being mounted for rotation and for longitudinal axial movement, a shaft, a carriage operable from said shaft, and means for controlling the sliding longitudinal axial movement of said movable member, said means including control members mounted on said carriage and additional control members movable with said movable member, and a device controlled by the control members on said carriage for engagement with said additional control members.

7. In coil winding apparatus, the combination of a rotatable and slidable member for supporting a core to be wound, a shaft, a carriage, means for operating said carriage from said shaft, said carriage having members mounted thereon for determining the number of turns to be wound, and means for controlling the sliding movement of said rotatable and slidable member, said means including stepped members movable with said rotatable and slidable member, and a device controlled by the control members on said carriage for engagement with said stepped members.

8. In coil winding apparatus, the combination of a rotatable and slidable member for supporting a core to be wound, a carriage, means for operating said carriage, control members mounted on said carriage in accordance with the number of turns to be wound, spaced members for controlling the spacing of coils to be wound, and a device controlled by the control members on said carriage for engagement with said spaced members.

9. In coil winding apparatus, the combination of a rotatable and slidable member for supporting a core to be wound, a shaft, a carriage, means for operating said carriage from said shaft, control members adjustably mounted on said carriage spaced in accordance with the number of turns to be wound, spaced members movable with said rotatable and slidable member for controlling the spacing of coils to be wound, and a member controlled by the control members on said carriage for successive engagement with said spaced members.

10. In coil winding apparatus, the combination of a rotatable member for supporting a core to be wound, a wire feed device, means for actuating said device in a path parallel to the longitudinal axis of the rotatable member, and means for positioning said rotatable member at a plurality of successive predetermined coil winding locations along its longitudinal axis, said means including spaced stop members mounted on said spindle for determining said respective locations.

11. In coil winding apparatus, the combination of a rotatable member for supporting a core to be wound, a wire feed carriage, mechanism for oscillatably operating said carriage in a path parallel to the longitudinal axis of the rotatable member, and means for positioning said rotatable member with respect to said carriage at successive predetermined coil winding locations with respect to said carriage.

12. In coil winding apparatus, the combination of a movable member for supporting a core to be wound, means for rotating said movable member, a wire feed device, mechanism for oscillating said device in a path parallel to the longitudinal axis of the movable member, and means for positioning said movable member along its longitudinal axis at a plurality of successive predetermined coil winding locations.

13. In coil winding apparatus, the combination of a movable member for supporting a core to be wound, means for rotating said movable member, a wire feed device, mechanism for oscillating said wire feed device in a path parallel to the longitudinal axis of the movable member, and means for positioning said movable member along its longitudinal axis at a plurality of successive predetermined coil winding locations.

14. In coil winding apparatus, the combination of a movable member for supporting a core to be wound, a wire feed device and mechanism for oscillating said wire feed device in a path parallel to the longitudinal axis of the movable member, a shaft, a carriage, means for operating said carriage from said shaft, control members mounted on said carriage and spaced in accordance with the number of turns to be wound, spaced members movable with said movable member for positioning said movable member to control the spacing of the coils to be wound, and a follower member controlled by the control members on said carriage for successive engagement with said spaced members.

15. In coil winding apparatus, the combination of a movable member for supporting a core to be wound, means for rotating said movable member, means for simultaneously feeding a plurality of strands of wire to the core to be wound for simultaneously winding thereon a plurality of coils, means for determining the number of turns supplied to the core at a particular location and means operable when a predetermined number of turns of wire have been supplied to the core for controlling the movement of said movable member along its longitudinal axis to a different location for winding another plurality of coils.

16. In coil winding apparatus, the combination of a movable member for supporting a core to be wound, means for rotating said movable member, means for simultaneously feeding a plurality of strands of wire to the core to be wound for simultaneously winding thereon a plurality of spaced coils, means operable when a predetermined number of turns of wire have been supplied to the core for controlling the movement of said movable member along its longitudinal axis to a different location for winding another plurality of spaced coils, and means operable by said controlling means for discontinuing rotation of said movable member.

17. In coil winding apparatus, the combination of a movable member for supporting a core to be wound, means for rotating said movable member, means for feeding a strand of wire to the core to be wound for winding a coil thereon, adjustable means for determining the number of turns supplied to the core and means operable when a predetermined number of turns of wire have been supplied to the core for controlling the movement of said movable member along its longitudinal axis to a different predetermined location for winding another coil.

18. In coil winding apparatus, the combination of a movable member for supporting a core to be wound, means for rotating said movable member at a predetermined speed, a shaft, a lead screw keyed to said shaft for rotation therewith, said lead screw being movable along said shaft, a carriage, members for connecting said carriage for movement with said lead screw, a plurality of plates mounted in said carriage, means for locking the plates in predetermined adjusted position, and members controlled by said plates for controlling the movement of said movable member along its longitudinal axis.

19. In coil winding apparatus, the combination of a movable member for supporting a core to be wound, means for rotating said movable member at a predetermined speed, a shaft, a lead screw keyed to said shaft for rotation therewith, said lead screw being movable along said shaft, a carriage, members for connecting said carriage for movement with said lead screw, a plurality of plates mounted in said carriage, means for locking the plates in predetermined adjusted position, and members connected to said movable member and controlled by said plates for controlling the movement of said movable member along its longitudinal axis.

20. In coil winding apparatus, the combination of a movable member for supporting a core to be wound, means for rotating said movable member at a predetermined speed, and a wire feed device, said wire feed device including a carriage movable in a path parallel to the longitudinal axis of the movable member, and wire strand tensioning mechanism on said carriage including fixedly mounted members and members movable laterally with respect to the aforesaid path.

21. In coil winding apparatus a combination of a movable member for supporting a core to be wound, a wire feed device, said wire feed device comprising a carriage, mechanism for oscillating said carriage in a path parallel to the longitudinal axis of the movable member, and wire tensioning mechanism including fixedly mounted members and members for moving said carriage in a lateral direction with respect to the aforesaid path.

22. In coil winding apparatus, the combination of a movable member for supporting a core to be wound, a wire feed device for controlling the feeding of a plurality of individual strands of wire to the core on said movable member, mechanism for oscillating said wire feed device in a path parallel to the longitudinal axis of the movable member, and tensioning mechanism carried by said wire feed device for imparting a predetermined tension to the plurality of strands of wire.

23. In coil winding apparatus, the combination of a movable member for holding a core to be wound, said member being supported for rotation and for longitudinal axial movement, means for rotating said movable member at a predetermined speed, a rotatable lead screw, a slidable member operated by said lead screw, means for urging the movable member in a longitudinal axial direction, means for normally holding said movable member against longitudinal axial movement, and control means on said slidable member for releasing said holding means.

24. In coil winding apparatus, the combination of a movable member for supporting a core to be wound, said member being supported for rotation and for longitudinal axial movement, means for rotating said movable member at a predetermined speed, a rotatable lead screw, a slidable member operated by said lead screw, means for urging the movable member in a longitudinal axial direction, means for normally holding said movable member against longitudinal axial movement, and spaced members on said slidable member for successively releasing said holding means.

25. In coil winding apparatus, the combination of a movable member for supporting a core tube to be wound, said member being supported for rotation and for longitudinal axial movement, means for rotating said movable member at a predetermined speed, a rotatable lead screw, a slidable member operated by said lead screw, means for normally urging the movable member in a longitudinal axial direction, spaced means for normally successively holding said movable member against longitudinal axial movement, and means including spaced members on said slidable member for successively releasing said holding means.

26. In coil winding apparatus, the combination of a movable member for holding a core to be wound, said member being supported for rotation and for longitudinal axial movement, means for rotating said movable member at a predetermined speed, a rotatable lead screw, a slidable member for movement with said lead screw, means for normally urging the movable member in a longitudinal axial direction, spaced means for normally successively holding said movable member against longitudinal axial movement, and means operated by said slidable member for releasing said holding means.

27. In coil winding apparatus, the combination of a movable member for holding a core to be wound, said member being supported for rotation and for longitudinal axial movement, means for rotating said movable member at a predetermined speed, a shaft, a lead screw operated by said shaft and movable therealong, a slidable member for movement with said lead screw, means for urging the movable member in a longitudinal axial direction, means for normally holding said movable member against longitudinal axial movement, and means operated by said slidable member for releasing said holding means.

WILLIAM F. SAUL.